J. B. LADD & D. BAKER.
PIG BREAKING MACHINE.
APPLICATION FILED DEC. 9, 1909.

1,112,146.

Patented Sept. 29, 1914.
6 SHEETS—SHEET 1.

Fig. 1.

WITNESSES:

INVENTORS
James B. Ladd,
and David Baker;
BY
ATTORNEY.

J. B. LADD & D. BAKER.
PIG BREAKING MACHINE.
APPLICATION FILED DEC. 9, 1909.

1,112,146.

Patented Sept. 29, 1914.
6 SHEETS—SHEET 2.

INVENTORS
James B. Ladd,
and David Baker;
BY
ATTORNEY.

J. B. LADD & D. BAKER.
PIG BREAKING MACHINE.
APPLICATION FILED DEC. 9, 1909.

1,112,146.

Patented Sept. 29, 1914.
6 SHEETS—SHEET 4.

WITNESSES:
Jas. C. Wobrusmith
Mae Hofmann

INVENTORS
James B. Ladd,
and David Baker;
BY
ATTORNEY.

J. B. LADD & D. BAKER.
PIG BREAKING MACHINE.
APPLICATION FILED DEC. 9, 1909.

1,112,146.

Patented Sept. 29, 1914.
6 SHEETS—SHEET 5.

WITNESSES:
Jas. C. Wobensmith
Mae Hofmann

INVENTORS
James B. Ladd,
and David Baker,
BY Jno. S. Crosdal
ATTORNEY.

Fig. 14.

UNITED STATES PATENT OFFICE.

JAMES B. LADD, OF ARDMORE, AND DAVID BAKER, OF HAVERFORD, PENNSYLVANIA.

PIG-BREAKING MACHINE.

1,112,146.    Specification of Letters Patent.    Patented Sept. 29, 1914.

Application filed December 9, 1909.  Serial No. 532,171.

*To all whom it may concern:*

Be it known that we, JAMES B. LADD and DAVID BAKER, citizens of the United States, residents, respectively, of Ardmore, Montgomery county, State of Pennsylvania, and Haverford, Delaware county, State of Pennsylvania, have invented a new and useful Pig-Breaking Machine, of which the following is a specification.

Our invention relates to improvements in pig breaking machines.

The object is to provide improved means for applying pressure at desired points on the sow and pigs either simultaneously or in required succession, means for controlling the actuating mechanism of the breaking means, improved means for moving the frame of pigs into a position to be acted upon by the breaking mechanism, automatic means for locking the carrying table against movement during the breaking position or operation of the breaking mechanism, and automatic means for preventing the actuation of the breaking mechanism until the table is withdrawn, improved clamping means for holding the sow during the breaking operation.

Our invention also comprises various improvements in details of construction and operation.

Referring to the drawings.

Similar numerals refer to similar parts throughout the several views.

Our machine consists of three main parts as follows: A receiving table, on which the frame of pigs is placed by traveling crane or other means, a feeding table for moving the frame of pigs forward, and the pig breaker proper. The receiving table is stationary, and consists of a pair of I-beams 15, supporting the angles 16 which form guides for the alinement of the frame of pigs.

Figures 4, 5, 6, 7, 8:
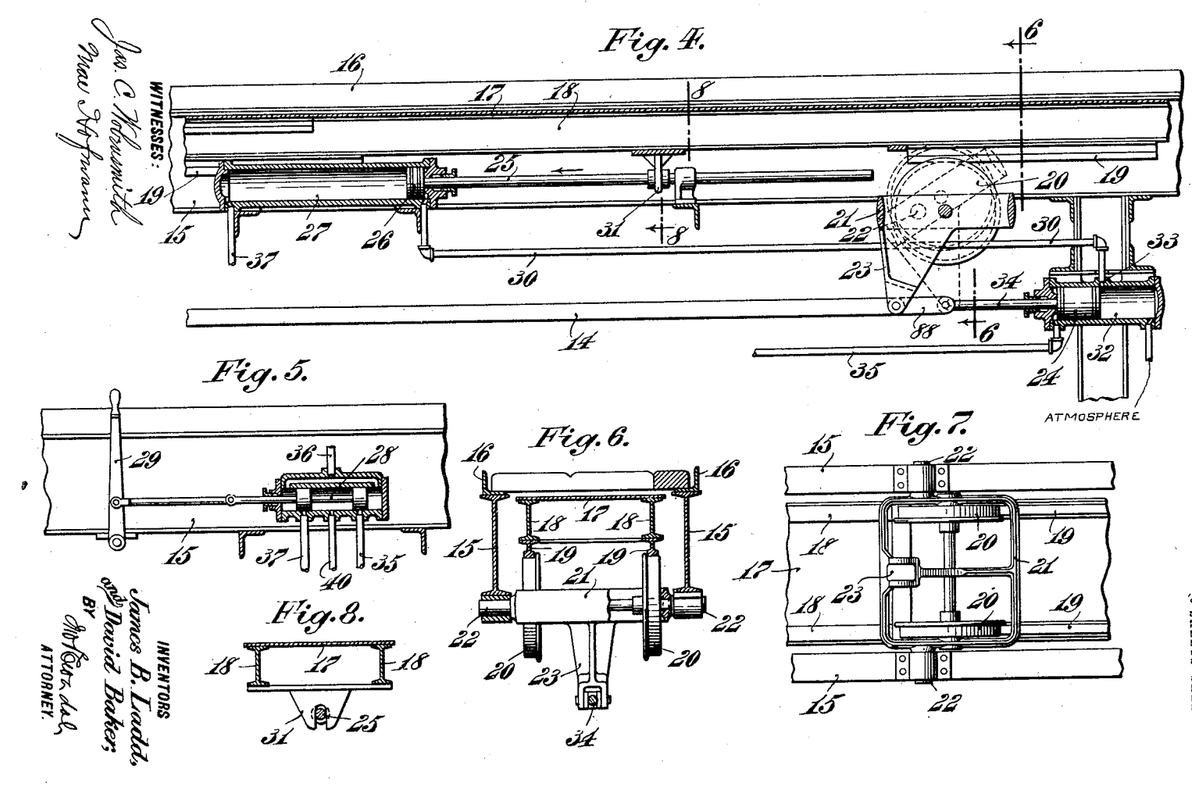
Fig. 4 is a longitudinal central section on an enlarged scale showing the table operating mechanism.
Fig. 5 is a detail in section of an operating valve which may be used for controlling the table operating mechanism.
Fig. 6 is a vertical cross-section on line 6—6 of Fig. 4, partly broken away.
Fig. 7 is an underneath plan view of a portion of the table and its supporting and operating mechanism.
Fig. 8 is a vertical cross-section on line 8—8 of Fig. 4.

The feeding table consists of a plate 17 mounted on I-beams 18 which are well braced and partly shod by the rails 19. This table is supported on four wheels 20, and is moved backward and forth on same by a suitable mechanism. The supporting car wheels 20 are mounted in trunnioned frames 21, trunnioned in the stationary bearings as at 22, and having brackets 23 adapted to be actuated so as to raise and lower said wheels to cause the elevation or depression of the table. It will be understood that there are two such trunnioned frames 21, one for each pair of wheels 20, each frame having a depending bracket 23. Said brackets are connected by the connecting rod 14 so that each trunnioned frame, and consequently all the wheels, will have the same and simultaneous movement. The horizontal movement of the tabe is secured by the piston rod 25 and piston 26 working in cylinder 27. The piston rod 25 is connected to the table by means of the bracket 31. A valve 28, see Fig. 5, operated by the hand lever 29, controls both cylinders 32 and 27.

The operation of the lever 29 is to first admit steam from the live steam pipe 40, through valve 28 and pipe 35, to the forward end of cylinder 32 to cause the backward movement of piston 24, and piston rod 34. The backward movement of piston rod 34, which is connected by link 88 with bracket 23, rocks the trunnioned frames 21 to elevate wheels 20 to cause the elevation of the table and to lift the frame of pigs from the stationary table. After the piston 24 passes the outlet 33 to pipe 30, steam is admitted from cylinder 32 through pipe 30, to cylinder 27 to cause the movement of the piston 26 and piston rod 25, in the direction of the arrow, see Fig. 4, causing the corresponding movement of the table to carry the frame of pigs into position to be broken. It will be understood that when the table is raised by the movement of piston rod 34, the table lifts the frame of pigs clear of the stationary receiving table, and in the horizontal movement of the table, the entire weight of the frame of pigs is carried on the wheels 20, with practically no friction. When the frame of pigs reaches the limit of the movement of the table in the direction of the arrow, the lever 29 is operated to cause the valve 28 to be shifted, bringing pipe 35 into communication with pipe 36. This brings the forward end of the cylinder 32 into communication with the exhaust 36. This permits the piston 24 of cylinder 32 to return to the left hand limit of its stroke, in response to the gravity actuation of the brackets 23, due to the weight of the feed table. It will be understood that the rear end of cylinder 32 is at all times in communication with the atmosphere. Simultaneously with the operation of valve 28 to permit the lowering of the table, steam is admitted through said valve and pipe 37 to the left hand end of cylinder 27, to actuate piston 26 and piston rod 25, to cause the return of the table to its initial position, it being understood that the steam is exhausted from the right hand end of cylinder 27 through pipe 30 and thence through cylinder 32, piston 24 of cylinder 32 having been moved to position shown in Fig. 4, to clear port 33. Upon the depression of the movable table, at the end of its feeding movement, the forward end of the frame of pigs is delivered so as to project over and rest upon the anvil bars 38 and 39. After the breaking of the frame of pigs, or the portion of the frame which projects over the anvil bars, as will be hereinafter described, the movement of the movable table is repeated as above described, to move the frame of pigs step by step until the entire frame is broken.

Figure 3:
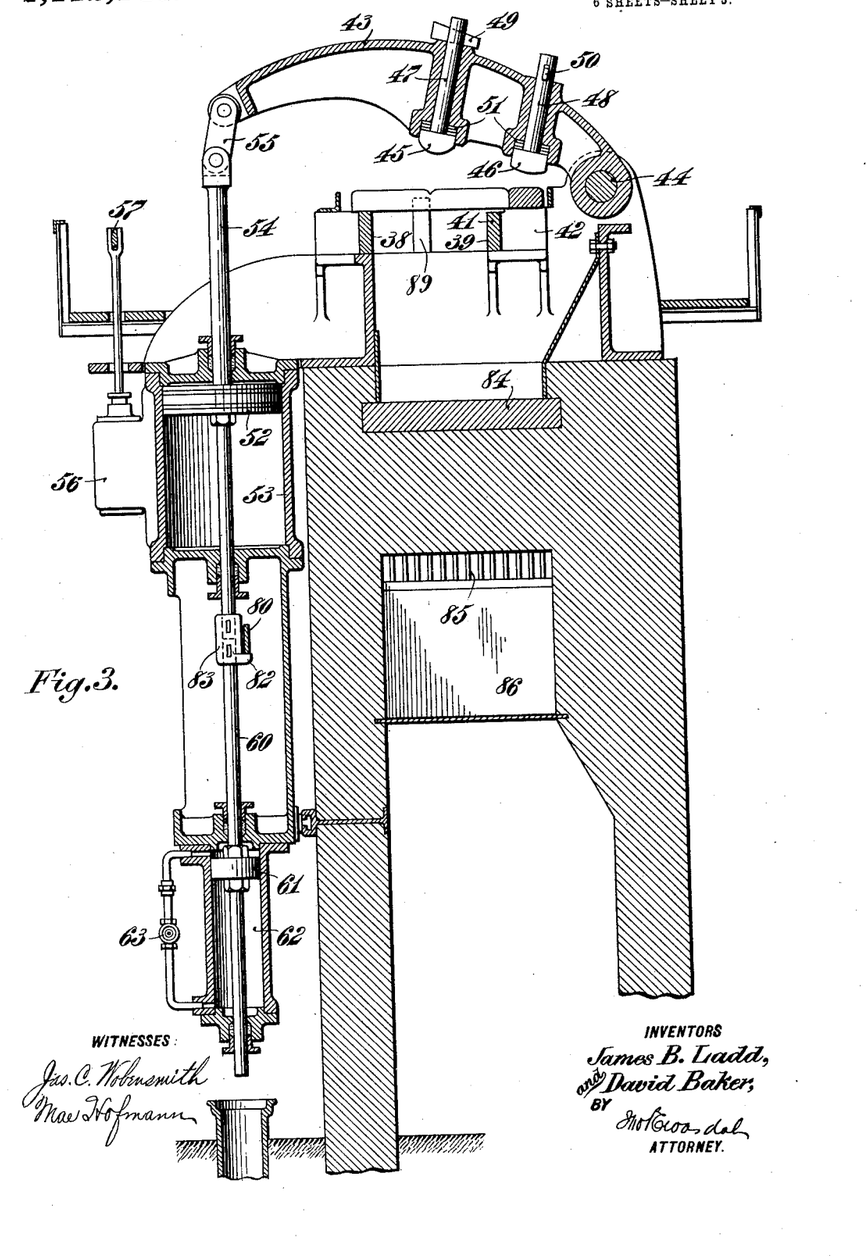
Fig. 3 is a vertical cross-section on line 3—3 of Fig. 1, on an enlarged scale.
Figures 9, 13:
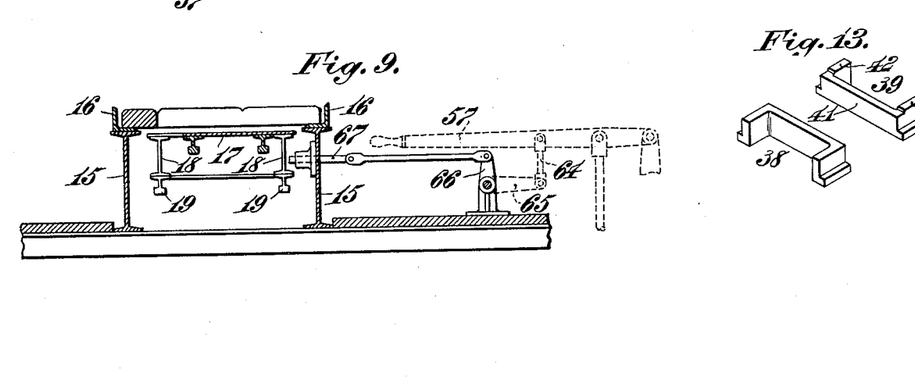
Fig. 9 is a sectional view on line 9—9 of Fig. 2 showing the interlocking mechanism for preventing improper actuation of the machine.
Fig. 13 is a perspective view of the anvil bars.

*Breaking mechanism.*—The breaking anvil 39 upon which the section of the frame of pigs is placed, as above described, is of the formation shown in Figs. 3 and 13, that is, there is an extension 41 parallel with the direction of the sow, and the two transverse extensions 42 for supporting the sow. It will be noted from an inspection of Figs. 3 and 13 that the supporting faces of the anvils 42 for the sow and the anvil 38 for the pigs are in the same horizontal plane, while the supporting surface of the pig anvil 41 is below said plane. This construction facilitates the bringing to bear of the necessary stress at the points *d*, see Fig. 14, where the pigs join the sow, to cause the break thereat. After which the pig engages both pig anvils for the further break at its middle part. The lowering of either pig anvil below the face of the other will accomplish this result. The breaking lever 43 is pivotally connected with the stationary structure at 44 and next to the sow, so that the sow will receive greater pressure than the pigs. This lever 43 is provided with the composite dies 45 and 46. The elements of dies 45 and 46 are held in position by the dies 47 and 48 respectively, and the keys 49 and 50. The desired position of adjustment of said dies is secured by the use of spacing washers 51.

By the construction of the anvil pieces 38 and 39 as above described, the sow will be supported at two points, and the four pigs at their free ends.

Figure 1:
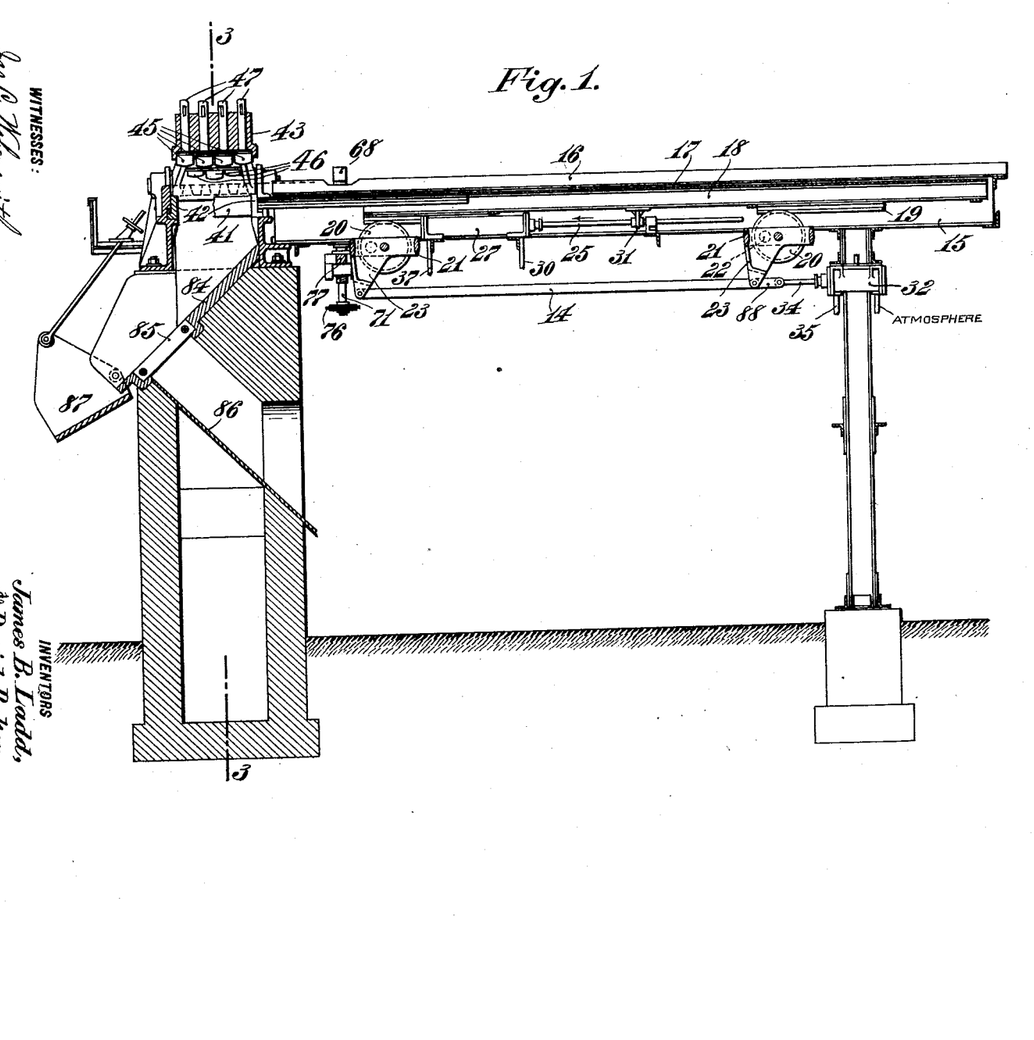
Figure 1 is a longitudinal central section.

*Operation.*—The operation of the lever 43 is to bring the dies down upon the sow and pigs so that dies 46 will exert a breaking pressure upon the sow first, about midway its two points of support and dies 45 will then exert a breaking pressure on the pigs at about midway their two points of support. The dies 46 being nearer the fulcrum 44 of lever 43 are adapted to exert a greater pressure, than dies 45; the sow requiring more pressure to break than the pigs. The dies 45 may be so shaped or positioned as to encounter the two middle pigs first, and afterward the two outer pigs, as shown in Fig. 1. The order of breaking may of course be reversed or changed, but the point is, that by thus applying the breaking pressure at different points dissimultaneously or in turn, instead of all the points simultaneously, the necessary power for operating the device is greatly reduced.

As a specific embodiment of our invention we have shown a composite sow breaking die and a composite pig breaking die. This is largely a matter of convenience for adjustment, etc. It is desirable however that the middle portion of the sow breaking die should be the lowest part thereof, and this die should have a considerable extension so as to hold the sow against the breaking operation of the pig breaking die.

Figure 14:
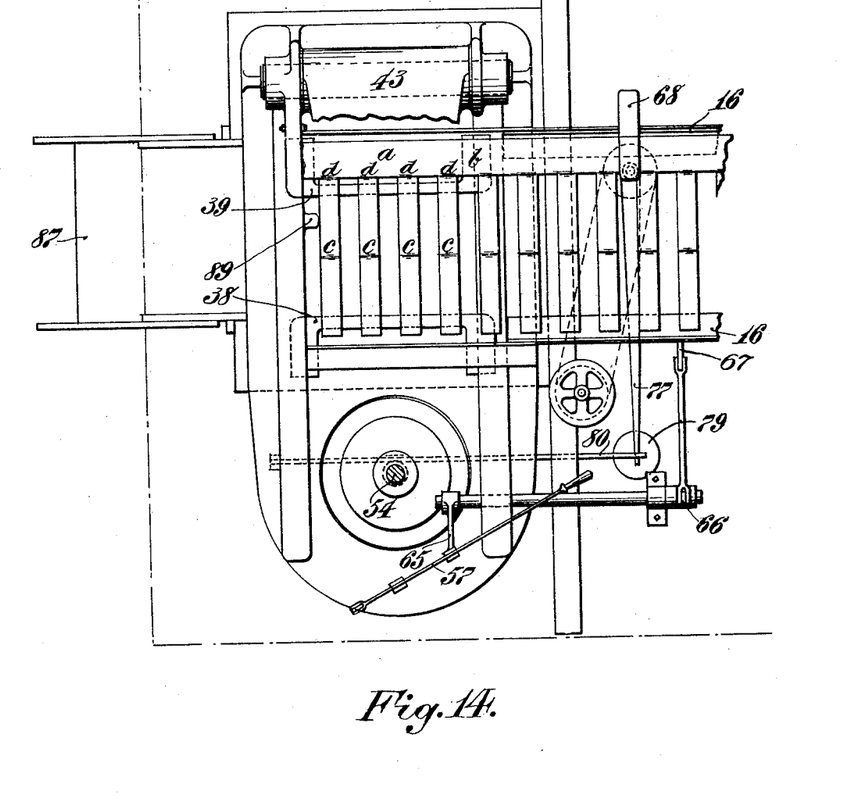
Fig. 14 is a plan view on an enlarged scale of a portion of the pig bed in position to be broken on the breaking anvils; the die lever being partly broken away.

Referring to Fig. 14, the breaking of the sow and pigs is as follows: The sow breaking die is preferably adapted to encounter the sow first at the point *a*. This causes the downward pressure of the portion of the sow between the extensions of anvil 39 which support the sow. This naturally causes the sow to break at *a* and also at *b* away from the main body of the pig bed. The die 46 holds the sow against the operation of the die 45 which engages the pigs at the points marked *c*. The die 45 engaging the pigs at the point marked *c* causes the downward pressure of the pigs between their supporting anvils 38 and 39. This causes the pigs to break in half at the points marked *c* and also causes the pigs to break away from the sow at the points marked *d*.

The operation of the lever 43 is secured by the piston 52 operating in cylinder 53, the piston rod 54 of said piston 52 being connected with the outer end of lever 43 by the link connection 55. The controlling valve 56 of the steam cylinder 53 is operated by the hand lever 57, see Figs. 2 and 9. The piston rod 60 connects piston 52 with piston 61 of the controlling or oil cataract cylinder 62. The purpose of this controlling cylinder 62, which is regulated by the cock 63, is to control the motion of the steam piston at all times and produce a smooth and steady action similar to that secured by the use of hydraulic power. This will prevent excessive shocks and their accompanying uncertain strains.

*Safety lock.*—In order to prevent the breaking operation taking place while the movable table is within the range of same, we provide the following automatic lock. To the lever 57 which operates the valve 56, controlling the steam cylinder 53, is secured the connecting link or rod 64, see Fig. 9. This connecting rod through the cranks or levers 65 and 66 moves the bolt or bar 67 into and out of the path of travel of one of the I-beams 18 of the movable table. That is to say for example, when the movable table is still within the range of the breaking device the engagement of the bolt 67 against the I-beam 18 will prevent the operation of the lever and consequently the operation of the valve for admitting steam to the cylinder 53 and hence will prevent the operation of the breaking lever 43. When the movable table is out of the range of the breaking mechanism the operation of the lever 57 to operate valve 56 controlling cylinder 53 will bring the bolt 57 within the range of travel of I-beam 18 of the movable table and thereby prevent the moving of the table within the range of the breaking mechanism.

Figures 10, 11:
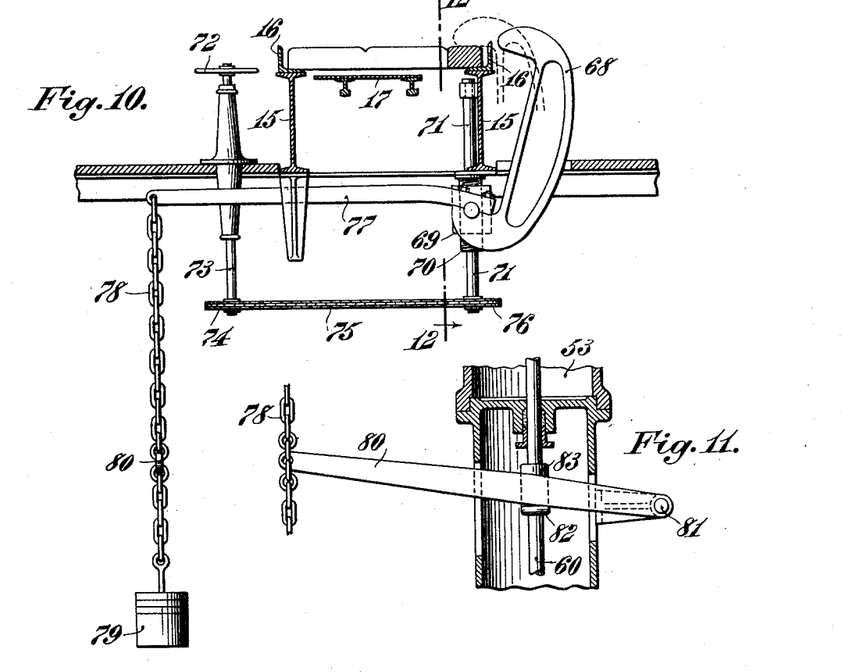
Fig. 10 is a vertical section on line 10—10 of Fig. 2.
Fig. 11 is a sectional detail of a portion of the sow clamp operating device.
Figure 12:
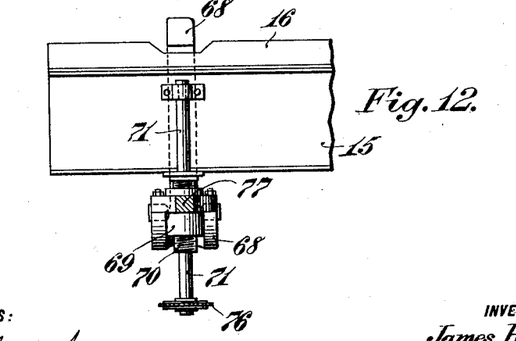
Fig. 12 is a section on line 12—12 of Fig. 10.

*Sow clamp.*—The breaking of the sow tends to raise the entire frame of pigs from the stationary receiving table, and to check such motion as might occur during the breaking of the last part of the frame, when its weight is light, we provide a sow clamp 68, see Fig. 10. This clamp member 68 is supported on the trunnioned block 69 which is threaded on the threaded shaft or sleeve 70, which in turn is supported on the shaft 71. This shaft 71 is adapted to be rotated by means of the hand wheel 72 through shaft 73 and the sprocket wheel 74, chain 75 and sprocket 76, so that by turning the wheel 72 the trunnioned block 69 may be raised or lowered to secure the desired position of adjustment of the clamp 68 to suit various thicknesses of sows. To the clamping member 68 is secured the lever 77, to the outer end of which is secured the chain 78 carrying the weight 79. This weight serves as a counterbalance for the clamp 68.

A lever 80 is pivotally connected at 81 and is adapted to engage with the lug 82 on sleeve 83 which is secured to the piston rod 60, see Figs 3 and 11, so that the clamping member 68 is operated with each operation of the piston rod 60, so as to move into and out of the clamping position with each downward or breaking movement of the breaking lever 43 and the upward movement thereof respectively. Beneath the breaking mechanism we provide the inclined surface 84, see Fig. 1, which directs the pigs over the grizzly 85 permitting the sand which is shaken off, to pass therethrough to the chute 86 while the broken pigs are delivered by the chute 87 to the car or other desired point.

Figure 2:
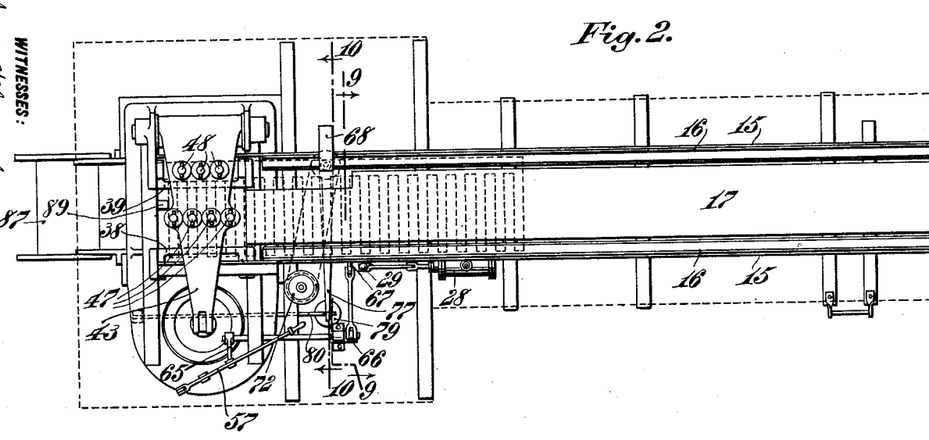
Fig. 2 is a plan view.

*Operation of the device.*—It will be seen that the entire operation of breaking a frame of pigs is controlled by a single operator who handles the two levers 29 and 57, and occasionally adjusts the hand wheel 72 in case of unusual variation in the thickness of the sows. It will be noted that lever 57 and lever 29 and hand wheel 72 are so assembled as shown in Fig 2, to be all within convenient reach of the operator. A frame of pigs having been placed on the stationary table, the operator moves lever 29 to cause the elevation of the movable table to lift the frame of pigs clear of the stationary table, and then to move said frame forward into a position over the breaking anvils, until it brings the frame up against a suitable stop 89, on the far side of the anvil bars. A reverse movement of lever 29 causes the lowering of the feeding table and its backward movement, from under the breaking mechanism, to its initial position. The operator then moves lever 57 which controls the valve 56 causing the operation of piston 52 and the downward movement of breaking lever 43, and a simultaneous clamping movement of the clamping member 68. After the breaking operation the clamp and breaking lever are raised and the portion of the sow which has been broken into two pieces and the four pigs which have been broken into two pieces each, making ten pieces in all, drop down and slide over the grizzly 85 and chute 87 into a car.

It will be understood that the above described specific construction, is simply a preferred example of the embodiment of our invention. The means for communicating the actuation of the piston to the dies, and the means for actuating the clamp, either automatically or by hand, may be varied and the device still comprise essential elements of our invention, as set forth in the claims.

What we claim is:—

1. In a pig breaking machine, the combination with breaking means of a stationary pig frame support and a vertically and horizontally movable pig frame support, and a fluid actuated piston operating independently of the breaking means for moving said movable support.

2. In a pig breaking machine, the combination with breaking means of a stationary pig frame support, a vertically and horizontally movable pig frame support, means operating independently of the breaking means for causing said vertical and horizontal movements comprising cylinders and pistons working therein and suitable connecting means, and automatic means for preventing the actuation of the movable pig frame support except only in desired relationship with the breaking operation.

3. In a pig breaking machine, the combination with breaking means of a stationary pig frame support, a vertically and horizontally movable pig frame support and means for causing said vertical and horizontal movements comprising a source of pressure, a pressure controlling valve, cylinders and pistons working therein, and suitable connections and means for operating the pressure controlling valve for automatically securing said vertical and horizontal movements in desired relationship with the breaking operation.

4. In a pig breaking machine, the combination of breaking means of a stationary pig frame support and a vertically and horizontally movable pig frame support, means for causing said vertical and horizontal movements comprising a source of elastic pressure, a plurality of cylinders and pistons working therein, a controlling valve means connecting the cylinder with the source of pressure and with the valve and with each other whereby upon a definite movement of one piston pressure is communicated from one cylinder to another.

5. In a pig breaking machine, the combination of supporting anvils, coöperating pig and sow breaking dies and a single supporting and operating member therefor, the anvils having separated sow-supporting surfaces and separated pig supporting surfaces, one pig supporting surface in a different horizontal plane from that of the sow-supporting surface.

6. In a pig breaking machine, the combination of suitable anvils for supporting the sow and pigs at separate points, a breaking lever provided with a die for exerting breaking pressure on the sow between the said points of support and a second die for exerting breaking pressure on the pigs midway their extensions, the fulcrum of the lever being next to the sow.

7. In a pig breaking machine, the combination of anvils for supporting the sow and pigs at separated points, a breaking lever provided with a plurality of dies for exerting breaking pressure on the sow between its points of support and on the pigs midway their extensions at each downward movement of the lever.

8. In a pig breaking machine, the combination of suitable anvils for supporting a portion of the sow at two separated points and a plurality of pigs at their free ends, a breaking lever provided with a die for exerting breaking pressure on the portion of the sow between its two points of support to break said portion into two pieces, and a second die for exerting breaking pressure on the pigs midway their extensions to break each pig into two pieces and from the sow.

9. In a pig breaking machine, the combination of supporting anvils for the sow and pigs, one of said pig anvils having its supporting face below the level of the supporting faces of the other anvils and coöperating breaking dies and actuating means therefor, whereby at a single operation of said dies, a portion of the sow is broken into two pieces and a plurality of pigs are broken from the sow and broken into two pieces each.

10. In a pig breaking machine, the combination of supporting anvils for the sow and pigs, coöperating dies for exerting breaking pressure thereon, a pivotally mounted die supporting lever having its pivot support on the sow side of the pig frame, a cylinder and a piston operating therein for actuating the die lever.

11. In a pig breaking machine, the combination of a breaking anvil for supporting a portion of the sow at two separated points and a plurality of pigs at their two ends, sow and pig dies and means for actuating the same, to break the sow portion into two pieces, the said dies coöperating with the anvil to break each pig from the sow portion into two pieces.

12. In a pig breaking machine, the combination of anvils for supporting the sow and pigs, a breaking lever provided with breaking dies, a cylinder and a piston operating therein for actuating the breaking lever, a cylinder and a piston therein operatively connected with the first piston for preventing excessive shocks.

13. In a pig breaking machine, the combination of breaking dies and means for operating the same, comprising a cylinder and a piston operating therein and a valve for controlling the same, a movable table for feeding the frame of pigs to the breaking mechanism and an automatic lock, controlled by the valve operating lever, for preventing the operation of the valve when the table is within the range of the breaking mechanism.

14. In a pig breaking machine, the combination of breaking dies and means for operating the same, comprising a cylinder and a piston operating therein and a valve for controlling the same, a movable table for feeding the frame of pigs to the breaking mechanism and an automatic lock, controlled by the valve operating lever, for preventing the movement of the table within the range of the breaking mechanism, after the valve is operated.

15. In combination with a pig breaking machine, comprising supporting anvils and breaking dies and actuating means for the dies, a sow clamp having rocking movement on a pivot support, actuated to rock into the clamping position to engage the sow prior to the engagement of the breaking die.

16. In combination with a pig breaking machine, comprising breaking dies and means actuating the same, an adjustable sow clamp and automatic means for actuating the clamp to engage the sow prior to the engagement therewith of the breaking die and means for causing the release of the clamp from the sow after the same has been broken.

JAMES B. LADD.
DAVID BAKER.

Witnesses as to James B. Ladd:
　LOUISE B. MORRIS,
　MAE HOFMANN.
Witnesses as to David Baker:
　LOUISE B. MORRIS,
　WALTER S. MYERS.

Copies of this patent may be obtained for five cents each, by addressing the "Commissioner of Patents, Washington, D. C."